US008095985B2

(12) United States Patent
Dunbar et al.

(10) Patent No.: US 8,095,985 B2
(45) Date of Patent: *Jan. 10, 2012

(54) PROTECTED MEDIA PATH AND REFUSAL RESPONSE ENABLER

(75) Inventors: Geoffrey Dunbar, Kirkland, WA (US); Chengyun Chu, Redmond, WA (US); James M. Alkove, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/870,837

(22) Filed: Oct. 11, 2007

(65) Prior Publication Data

US 2008/0092238 A1   Apr. 17, 2008

Related U.S. Application Data

(63) Continuation of application No. 10/820,666, filed on Apr. 8, 2004, now Pat. No. 7,296,296.

(60) Provisional application No. 60/513,831, filed on Oct. 23, 2003.

(51) Int. Cl.
*G06F 7/04* (2006.01)
*H04N 7/16* (2006.01)

(52) U.S. Cl. ........................................................ 726/26

(58) Field of Classification Search ........ 26/26; 726/26, 726/27, 28, 29, 30
See application file for complete search history.

(56) References Cited

U.S. PATENT DOCUMENTS

| 5,715,403 | A | * | 2/1998 | Stefik | 705/44 |
| 6,134,659 | A | * | 10/2000 | Sprong et al. | 713/190 |
| 6,219,788 | B1 | * | 4/2001 | Flavin et al. | 713/194 |
| 6,226,618 | B1 | * | 5/2001 | Downs et al. | 705/51 |
| 6,266,480 | B1 | | 7/2001 | Ezaki et al. | 386/94 |
| 7,120,250 | B2 | * | 10/2006 | Candelore | 380/200 |
| 7,200,760 | B2 | * | 4/2007 | Riebe et al. | 713/194 |
| 7,254,836 | B2 | * | 8/2007 | Alkove et al. | 726/26 |
| 7,296,296 | B2 | * | 11/2007 | Dunbar et al. | 726/26 |
| 7,574,747 | B2 | * | 8/2009 | Oliveira et al. | 726/29 |
| 7,584,502 | B2 | * | 9/2009 | Alkove et al. | 726/6 |
| 7,822,863 | B2 | * | 10/2010 | Balfanz et al. | 709/229 |
| 7,860,250 | B2 | * | 12/2010 | Russ et al. | 380/234 |

(Continued)

FOREIGN PATENT DOCUMENTS

EP    1083480 A1    3/2001

(Continued)

OTHER PUBLICATIONS

Hong, S. et al., "On the construction of a powerful distributed authentication server without additional key management", *Computer Communications*, 2000, 23, 1638-1644.

(Continued)

*Primary Examiner* — David Garcia Cervetti
(74) *Attorney, Agent, or Firm* — Woodcock Washburn LLP

(57) ABSTRACT

In a protected media path for delivering content from a source to a sink, a source authority (SOTA) on behalf of the source decides with regard to a policy corresponding to the content that a particular type of action with the content is to be refused, and provides a particular enabler to an application. The provided enabler includes information and methods necessary for the application to obtain data necessary to respond to the refusal. The application receives the enabler at an interface thereof and the interface applies a common interaction procedure to run the enabler to obtain the data necessary to respond to the refusal.

17 Claims, 6 Drawing Sheets

U.S. PATENT DOCUMENTS

| | | | |
|---|---|---|---|
| 7,881,315 B2* | 2/2011 | Haveson et al. | 370/401 |
| 2002/0023207 A1* | 2/2002 | Olik | 713/153 |
| 2002/0036991 A1* | 3/2002 | Inoue | 370/328 |
| 2003/0055898 A1* | 3/2003 | Yeager et al. | 709/205 |
| 2003/0165241 A1* | 9/2003 | Fransdonk | 380/258 |
| 2003/0219127 A1* | 11/2003 | Russ et al. | 380/239 |
| 2003/0221100 A1* | 11/2003 | Russ et al. | 713/153 |
| 2004/0054629 A1* | 3/2004 | de Jong et al. | 705/51 |
| 2004/0187001 A1* | 9/2004 | Bousis | 713/175 |
| 2004/0249768 A1* | 12/2004 | Kontio et al. | 705/65 |
| 2005/0089164 A1 | 4/2005 | Lang et al. | 380/201 |
| 2005/0091488 A1* | 4/2005 | Dunbar et al. | 713/165 |
| 2005/0091526 A1* | 4/2005 | Alkove et al. | 713/200 |
| 2005/0123276 A1 | 6/2005 | Sugaya | 386/94 |
| 2005/0240985 A1* | 10/2005 | Alkove et al. | 726/1 |
| 2005/0262022 A1* | 11/2005 | Oliveira et al. | 705/51 |
| 2005/0265549 A1 | 12/2005 | Sugiyama et al. | 380/201 |
| 2006/0041943 A1* | 2/2006 | Singer et al. | 726/27 |
| 2007/0297426 A1* | 12/2007 | Haveson et al. | 370/401 |
| 2010/0250927 A1* | 9/2010 | Bradley et al. | 713/167 |

FOREIGN PATENT DOCUMENTS

| | | |
|---|---|---|
| EP | 1130492 A2 | 9/2001 |
| EP | 1191422 A2 | 3/2002 |
| WO | WO 00/58811 | 10/2000 |
| WO | WO 00/59150 | 10/2000 |
| WO | WO 01/52020 | 7/2001 |
| WO | WO 01/52021 A1 | 7/2001 |
| WO | WO 02/057865 | 7/2002 |

OTHER PUBLICATIONS

Managing Digital Rights in Online Publishing, "How two publishing houses maintain control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

Castro, M. et al., "Secure Routing for Structured Peer-to-Peer Overlay Networks", *Proceedings of the 5th Symposium on Operating Systems Design and Implementation*, 2002, 299-314.

Friend, R., "Making the Gigabit IPsec VPN Architecture Secure", *Computer*, 2004, 37(6), 54-60.

Hulicki, Z., Security Aspects in Content Delivery Networks [DVB Networks], *69th World Multiconference on Systemics, Cybernetics and Informatics. Proceedings*, 2002, 10, 135-139.

McGarvey, R., "Arbortext: Enabler of Multichannel Publishing", *EContent*, 2002, 25(4), 48-49.

Moffett, S. et al., "Contributing and Enabling Technologies for Knowledge Management", *International Journal of Information technology and Management*, 2003, 2(1-2)31-49.

Bovet, "Understanding the LINUX Kernels", XP-002569419, O Reilly, USA, (no month available), 2001, 15 pages.

EP Application No. 04779478: Supplementary European Search Report dated Mar. 10, 2010.

EP Application No. 04779544: Supplementary European Search Report dated Mar. 9, 2010.

* cited by examiner

PROTECTED MEDIA PATH AND REFUSAL RESPONSE ENABLER

CROSS-REFERENCE TO RELATED APPLICATIONS

This application is a continuation of U.S. application Ser. No. 10/820,666, filed Apr. 8, 2004, which claims the benefit of U.S. Provisional Application No. 60/513,831, filed Oct. 23, 2003 and entitled "PROTECTED MEDIA PATH AND REFUSAL RESPONSE ENABLER", hereby incorporated by reference in its entirety.

TECHNICAL FIELD

The present invention relates to an architecture and method for establishing a protected media path for delivering content in a trusted manner from any of a variety of sources to any of a variety of sinks by way of a common base. More particularly, the present invention relates to such an architecture and method whereby the content is delivered only after the path is established as trustworthy and satisfying policy corresponding to the content.

BACKGROUND OF THE INVENTION

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the DRM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

In an RM system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. However, it is to be appreciated that various pieces of content 12 can be protected according to a plurality of RM systems 10, each of which is not necessarily compatible with every other RM system 10.

Accordingly, a need exists for an architecture and method that define a protected media path for content 12 from any of a plurality of systems 10 to be delivered to any of a plurality of destinations. In particular, a need exists for a method in connection with such an architecture that defines how the path is established as trustworthy and satisfying policy corresponding to the content 12.

SUMMARY OF THE INVENTION

The aforementioned needs are satisfied at least in part by the present invention in which a method is provided for delivering content from a source to a sink by way of a computing device. An application on the computing device calls to a media base on the computing device with a definition of the content, the source, and the sink, and the media base establishes a protected media path based on the defined content, source, and sink to effectuate such delivery. The established protected media path includes the media base, a source trust authority (SOTA) associated with and corresponding to the source and acting as a secure lockbox connecting the source to the media base and representing the source in the protected media path, and a sink trust authority (SITA) associated with and corresponding to the sink and acting as a secure lockbox connecting the sink to the media base and representing the sink in the protected media path.

The SOTA on behalf of the source establishes trust with respect to the protected media path, and upon trust being established with respect to the protected media path propagates policy corresponding to the content to be delivered to the protected media path. The SOTA determines a particular type of action to be taken with the content as delivered through the protected media path, decides with regard to the propagated policy that the particular type of action cannot be taken with the content as delivered through the protected media path, and informs the media base of a refusal to take such action. The media base in turn informs the application of the refusal to take the action.

The SOTA recognizes that the refusal may be rectified by way of a particular enabler available to such SOTA, and the SOTA provides the particular enabler to the application by way of the media base. The provided enabler includes information and methods necessary for the application to obtain data necessary to respond to the refusal. The application receives the enabler at an interface thereof by way of the media base, and the interface applies a common interaction procedure to run the enabler to obtain the data necessary to respond to the refusal. Thereafter, the application provides the obtained data to the media base and the media base employs the provided data to respond to the refusal.

The SOTA then decides with regard to the propagated policy and based at least in part on the responded refusal that the particular type of action can be taken with the content as delivered through the protected media path and informs the media base regarding same, and the media base informs the application that the particular type of action can be taken. The application proceeds by commanding the media base to perform such type of action.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 2:
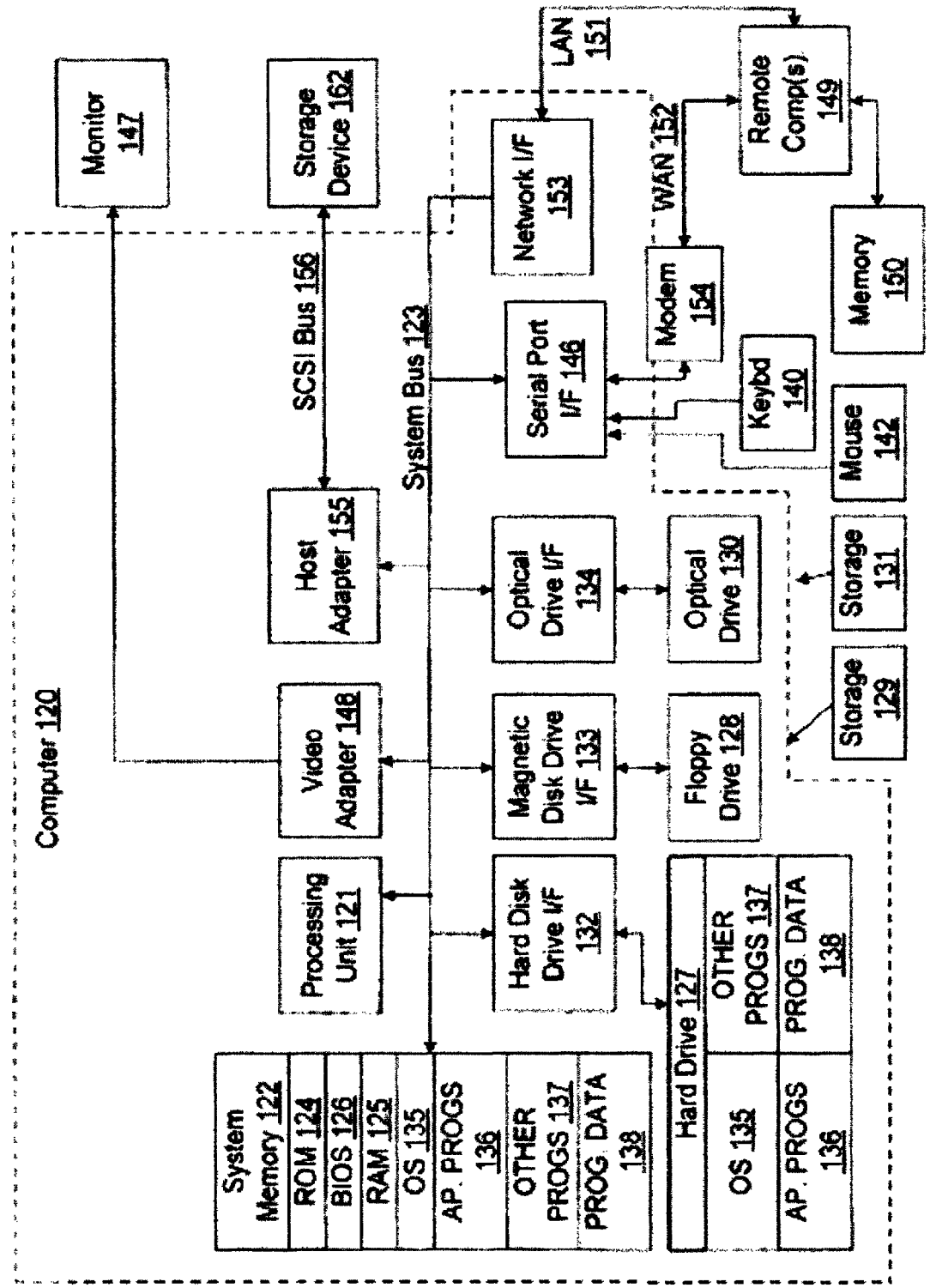
FIG. 2 is a block diagram representing a general purpose computer system in which aspects of the present invention and/or portions thereof may be incorporated.

FIG. 2 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Protected Media Path

Content protection denotes a spectrum of methods and technologies for protecting digital content 12 such that such content 12 cannot be used in a manner inconsistent with the wishes of the content owner and/or provider. Methods include copy protection (CP), link protection (LP), conditional access (CA), rights management (RM), and digital rights management (DRM), among other. The Base of any content protection system is that only a trusted application that ensures proper adherence to the implicit and/or explicit rules for use of protected content 12 can access same in an unprotected form. Typically, content 12 is protected by being encrypted in some way, where only trusted parties are able to decrypt same.

Copy protection, in the strictest sense, specifically applies to content 12 residing in a storage device, whereas link protection applies to content 12 flowing between applications/devices over a transmission medium. Conditional access can be thought of as a more sophisticated form of link protection, where premium programs, channels and/or movies are encrypted in transit. Only subscribers who have paid for access to such content 12 are provided with the keys necessary to decrypt same.

Digital Rights Management is an extensible architecture where the rules regarding sanctioned use of a particular piece of content 12 are explicit and bound to or associated with the content 12 itself. DRM mechanisms can support richer and more expressive rules than other methods while providing greater control and flexibility at the level of individual pieces of content or even sub-components of that content. An example of a Digital Rights Management system is set forth in U.S. patent application Ser. No. 09/290,363, filed Apr. 12, 1999 and U.S. Provisional Application No. 60/126,614, filed Mar. 27, 1999 each of which is hereby incorporated by reference in its entirety.

Rights Management is a form of DRM that is organizationally based in that content 12 can be protected to be accessible only within an organization or a subset thereof. An example of a Rights Management system is set forth in U.S. patent application Ser. Nos. 10/185,527, 10/185,278, and 10/185,511, each filed on Jun. 28, 2002 and hereby incorporated by reference in its entirety.

In the present invention, a protected media path architecture is defined on a computing device 14 to allow for content processing and delivery from any of multiple content management systems including the systems set forth above. In particular, such architecture provides a mechanism for delivering protected content 12 from a source 30 to a destination or 'sink' 32 while enabling the protected content 12 to be processed as necessary. Note that the source 30 is a system delivering or 'sourcing' the content 12 and may be any appropriate system without departing from the spirit and scope of the present invention, presuming of course that the source 30 can interact with the architecture. For example, the source 30 may be any of several highly functional or minimally functional rights management systems, such as a DRM or RM system, or may be any of several sources 30 with limited content protection, such as a CP, LP, or CA system, or may even be any of several sources 30 with little if any content protection inherent therein, such as a basic data storage system or server, file storage system or server, or the like. Note that the source 30 may obtain the actual content 12 from elsewhere. For example, the content 12 if rights-protected may be located on a remote file server but accessible by way of a source 30 such as a rights management system on the computing device 14.

Generally, then, a source 30 is capable of sourcing multimedia data in a generic manner through a given interface. Implementations of a source 30 correspond with different means of accessing content, and can include a DRM source capable of reading DRM files from a hard drive or other file system), a DVD source capable of reading DVD multimedia data from a DVD disk, etc. Note that being a source 30 does not necessarily imply content protection of the content 12 therefrom. For some sources 30, then, content protection may or may not be present for any given instance.

Likewise, each of one or more sinks 32 is a system receiving or 'sinking' the content 12 and may be any appropriate system without departing from the spirit and scope of the present invention, again presuming of course that the sink 32 can interact with the architecture. For example, the sink 32 may be an audio system for receiving audio to be delivered to a speaker, a video system for receiving video be delivered to a display, a light control system for receiving light control signals to be delivered to a controller for a light system, a motor control system for receiving motor control signals to be delivered to a controller for a motor system, and the like. Moreover, the sink 32 may merely be an interface connecting to a conduit such as network or a data cable. Note that as with the source 30, the sink 32 may deliver the actual content 12 to elsewhere. For example, the content if audio may be delivered to a remote speaker by way of a sink 32 such as a sound card on the computing device 14. Note that a given sink 32 is associated with an output resource, and not a content protection system. For any instance of a sink 32, there may or may not be a content protection system associated with it.

Figure 3:
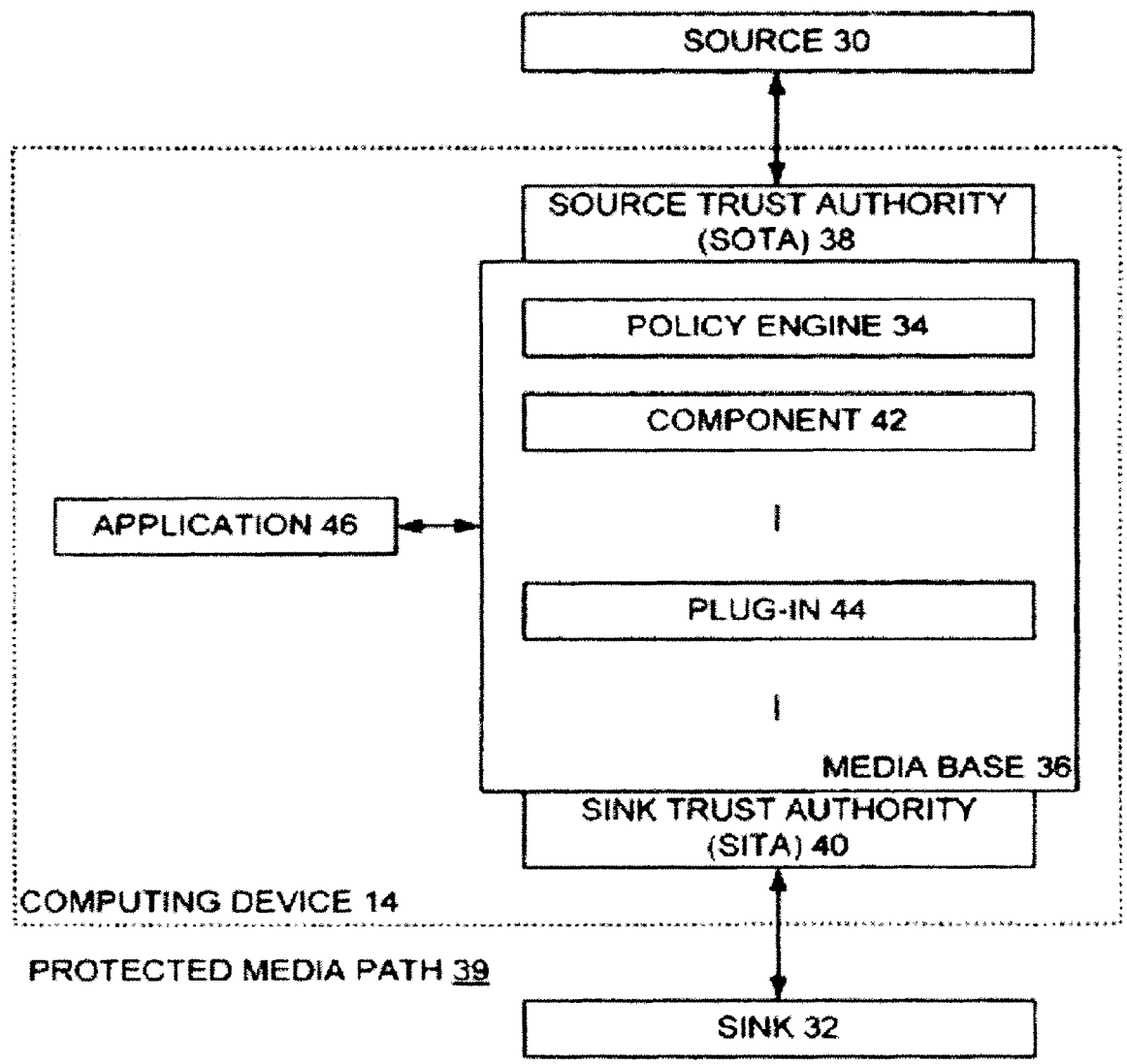
FIG. 3 is a block diagram showing a portable media path as defined by a media base upon being called by an application to deliver content from a source to a sink in accordance with one embodiment of the present invention.

Significantly, in the architecture, and turning now to FIG. 3, each source 30 and each sink 32 can integrate to a policy engine 34 of a media base 36 on the computing device 14 by way of providing or accessing a corresponding source trust authority (SOTA) 38 or sink trust authority (SITA) 40, respectively. Thus, each source 30 and each sink 32 can be local to or remote from the computing device 14, but each corresponding SOTA 38 and SITA 40 is local to the computing device 14, thereby acting in at least some respects as the agent or representative for the respective source 30 and sink 32. Significantly, and as should be appreciated, most any source 30 or sink 32 can participate with the media base 36 and the protected media path architecture by having a corresponding SOTA 38 or SITA 40, respectively.

Figure 1:
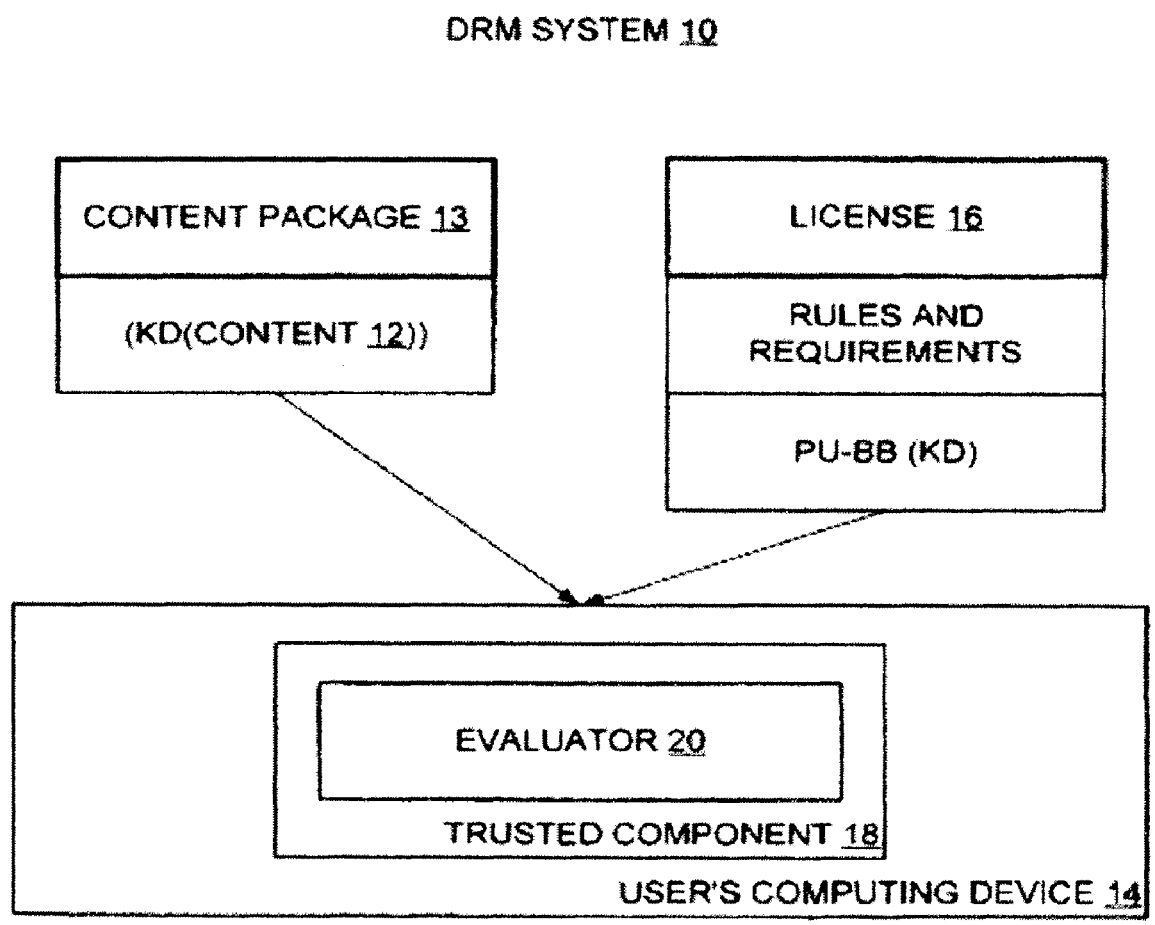
FIG. 1 is a block diagram showing an enforcement architecture of an example of a trust-based system.

Each SOTA 38 represents a corresponding source 30 in the protected media path 39 defined by the architecture, and functions to provide decryption functionality for decrypting the content 12 from the source 30 if necessary and also to translate policy associated with the content 12 from a native format into a format amenable to the policy engine 34. As may be appreciated, such policy is essentially the rules and requirements for accessing and rendering the content 12, such as for example may be set forth in the license 16 of FIG. 1. Note that the SOTA 38 may also act for the source 30, particularly with regard to questions relating to trust, policy, and rights.

Likewise, each SITA 40 represents a corresponding sink 32 in the protected media path 39 defined by the architecture, and functions to provide encryption functionality to encrypt content 12 to be delivered to the sink 32 if necessary and also to translate policy associated with the content 12 from the format of the policy engine 34 into a format amenable to the sink 32. Thus, the sink 32 receives the content 12 and corresponding policy, decrypts the received content 12 if necessary, and renders same based on the received policy. Note that the SOTA 38 may likewise act for the sink 32, particularly with regard to questions relating to trust, policy, and rights.

Note also that the policy corresponding to any particular piece of content 12 may be any appropriate policy without departing from the spirit and scope of the present invention. Such policy typically is set forth in the aforementioned native format which is specific to a particular source, and can have any arbitrarily complexity. For example, the policy can be expressed as a series of bits set on or off, can include logic set out in a pre-defined language to be executed, and/or can even include or refer to executable machine code. Generally, the policy may express information such as an action that can be taken with respect to the corresponding content 12, a condition precedent to the action that must exist, an event subsequent to the action that must be taken, elements that are to be present or that cannot be present with respect to the content 12, conditions on such elements, policy to be forwarded with delivered content, and the like.

The policy engine 34 of the media base 36 is the heart of the protected media path architecture and is responsible for enforcing policy on behalf of each SOTA 38. Thus, and as will be set forth in more detail below, the policy engine 34 negotiates policy between each applicable source 30 and each applicable sink 32, including required sink content protection systems, outbound policy on sink content protection systems, and media path component inclusion and exclusion. The policy engine 34 also provides a protected environment within which received content 12 can be processed with a level of assurance that the content 12 is protected from theft by a nefarious entity.

The media base 36 having the policy engine 34 is essentially a common collection of functions necessary to provide a common infrastructure for effectuating processing of content 12 from any particular source 30 and for delivering the processed content 12 to any particular sink 32. Significantly, although the format of the content 12 and associated policy may vary from source 30 to source 30, the media base can handle such content 12 and associated policy because each source 30 has a corresponding SOTA 38 which decrypts the content 12 if necessary and translates the associated policy from the aforementioned native format into the aforementioned format amenable to the policy engine 34. Likewise, although the format of the content 12 and associated policy may vary from sink 32 to sink 32, the media base can handle such content 12 and associated policy because each sink 32 has a corresponding SITA 40 which encrypts the content 12 if necessary and translates the associated policy from the aforementioned format amenable to the policy engine 34 into the format amenable to the sink 32.

More specifically, the media base 36 provides a common infrastructure to enable media content 12 to flow to and from protected environments by providing a protected environment in the operating system of the computing device 14, a general mechanism for translating and negotiating rights, rules and policy across protected environment boundaries, and a general mechanism for encrypting/decrypting high bit-rate media data while passing same securely between the protected environment on the computing device 14 and other protected environments. Thus, the media base 36 allows protected content 12 to flow from, to and through the computing device 14 in a protected fashion, and allows for arbitrary processing of protected content 12. As a result, any interested party can add support for arbitrary content protection to the operating system on the computing device 14 by distributing appropriate SOTAs 38 and/or SITAs 40, as the case may be.

Typically, and as seen in FIG. 3, the media base 36 includes therein a number of core components 42 that provide the aforementioned common infrastructure of such media base 36. As may be appreciated, each component 42 may be any appropriate component without departing from the spirit and scope of the present invention. Employing such core components 42 is generally known or should be apparent to the relevant public and therefore need not be set forth herein in any detail.

In addition to the functionality provided by the core components 42 of the media base 36, and if necessary, any interested party can add support for additional arbitrary protected functionality to the operating system on the computing device 14 by distributing appropriate supplemental components or 'plug-ins' 44 that are designed to work in conjunction with the media base 36 to provide such additional functionality. As may be appreciated, each plug-in 44 may be any appropriate plug-in without departing from the spirit and scope of the present invention. Employing such plug-ins 44 is generally known or should be apparent to the relevant public and therefore need not be set forth herein in any detail.

In one embodiment of the present invention, the media base 36 is actuated to arrange a protected media path 39 between each of one or more selected sources 30 and each of one or more selected sinks 32 by a media application 46 on the computing device 14. Presumably, the media application 46 is under the control of a user or another application on the computing device 14 or elsewhere. Thus, the media application 46 selects the content 12 to be rendered, and in doing so selects the one or more selected sources 30, and if necessary selects the one or more sinks 32. Thereafter, the media application 46 is not involved in the rendering of the protected content 12 by way of the arranged protected media path 39, except perhaps to provide rendering control commands such as start, stop, repeat, reverse, fast forward, and the like.

In one embodiment of the present invention, the media base 36 and the protected media path 39 arranged thereby are solely responsible for controlling the content 12 within such arranged protected media path 39, and correspondingly, the application 46 has no control over the content 12 within such arranged protected media path 39. Thus, the application 46 directs the rendering of the content 12 by way of the media base 36 and the protected media path 39 arranged thereby, but does not have any actual access to or control over such content 12, especially in any non-protected form. In particular, the media base 36 and the protected media path 39 cannot be directed by the application 46 or by any other element to take an action with respect to the content 12 contrary to the policy corresponding to the content 12. As a result, and significantly, the application 46 need not establish any especial trustworthiness in connection with the protected media path 39 of FIG. 3, and in fact the application 46 is not trusted to handle the content 12 in any trusted manner. Of course, such lack of trust in the application 46 is not detrimental in any way inasmuch as the application 46 does not in fact handle the content 12 other than issuing rendering control commands such as those set forth above in the course of operation of the media base 36 and the protected media path 39 arranged thereby.

To summarize, then, the media base 36 operates under the direction of an application 46 to arrange a protected media path 39 by which content 12 from one or more sources 30 is to be delivered to one or more sinks 32. Presumably, the content 12 is operated upon by the media base 36 in some manner while transiting the arranged protected media path 39, although such operations on such content 12 by such media base 36 may be as minimal or as maximal as need be. Significantly, before each source 30 allows content 12 thereof to transit the arranged protected media path 39, and in one embodiment of the present invention, the source 30 is satisfied that the media base 36, the policy engine 34 thereof, each employed component 42 thereof, each employed plug-in 44 thereof, each receiving sink 32, and any other element that touches upon or 'touches' the content 12 is (a) trustworthy and (b) has rights to touch the content 12 based on the policy associated with the content 12.

In terms of the present invention, an element can be shown to be trustworthy based on a proffer of a token that vouches for the element. Such vouching token may be any appropriate vouching token without departing from the spirit and scope of the present invention. For example, and especially in the digital realm, such vouching token may comprise a digital certificate from a vouching authority, perhaps including a verifying chain of certificates extending back to a known and trusted root authority. Such certificate could include a hash of the to-be-trusted element verifiable based on a key in the certificate, whereby alteration of the element for any purpose, including violating the trust of such element, would result in the hash failing to verify, in which case the element is not to be trusted.

Also in terms of the present invention, once an element is deemed trustworthy, the element is trusted to decide for itself whether it can touch the content 12 based on whether it can honor the rights set forth in the policy associated with the content 12. Alternately, the element is trusted to respond truthfully to a rights-based query from another element. For example, if the policy states that an element must have at least a certain version number and the element has an older version number, the element is trusted to decline to touch the content 12, and in this particular case might be expected to explain to an inquiring party the reason for so declining. Likewise, if for example the policy states that an element must not store the content 12 in an unprotected form and the element does in fact do so, the element is likewise trusted to decline to touch the content 12, and again in this particular case might be expected to explain to an inquiring party the reason for so declining.

In one embodiment of the present invention, and turning now to FIG. 4, the protected media path architecture as set forth in FIG. 3 is employed to deliver content 12 from one or more sources 30 to one or more sinks 32 in the following manner. Preliminarily, the application 46 at the direction of a user or another element wishes to transit content 12 from one or more sources 30 to one or more sinks 32, and therefore calls to the media base 36 with a definition of the content 12, each such source 30 from which the content 12 is to be obtained, and each such sink 32 to which the content 12 is to be delivered (step 401).

In response, the media base 36 based on the defined content 12, sources 30, and sink 32 establishes a protected media path 39 to effectuate such delivery (step 403). Note that in doing so, the media base 36 may select one or more components 42 thereof that are to handle and operate on the content 12 while being delivered through the protected media path 39, and may likewise select one or more plug-ins 44 thereof that are also to handle and operate on the content 12 while being delivered through the protected media path 39. The media base 36 may employ any appropriate methodology to establish the protected media path 39 and select the components 42 and plug-ins 44 without departing from the spirit and scope of the present invention. Such establishing of the protected media path 39 and selecting of the components 42 and plug-ins 44 by the media base 36 is known or should be apparent to the relevant public and therefore need not be set forth herein in any detail. For example, actions taken by and in connection with the media base 36 of the present invention may include those set forth in the Appendix.

Figure 4:
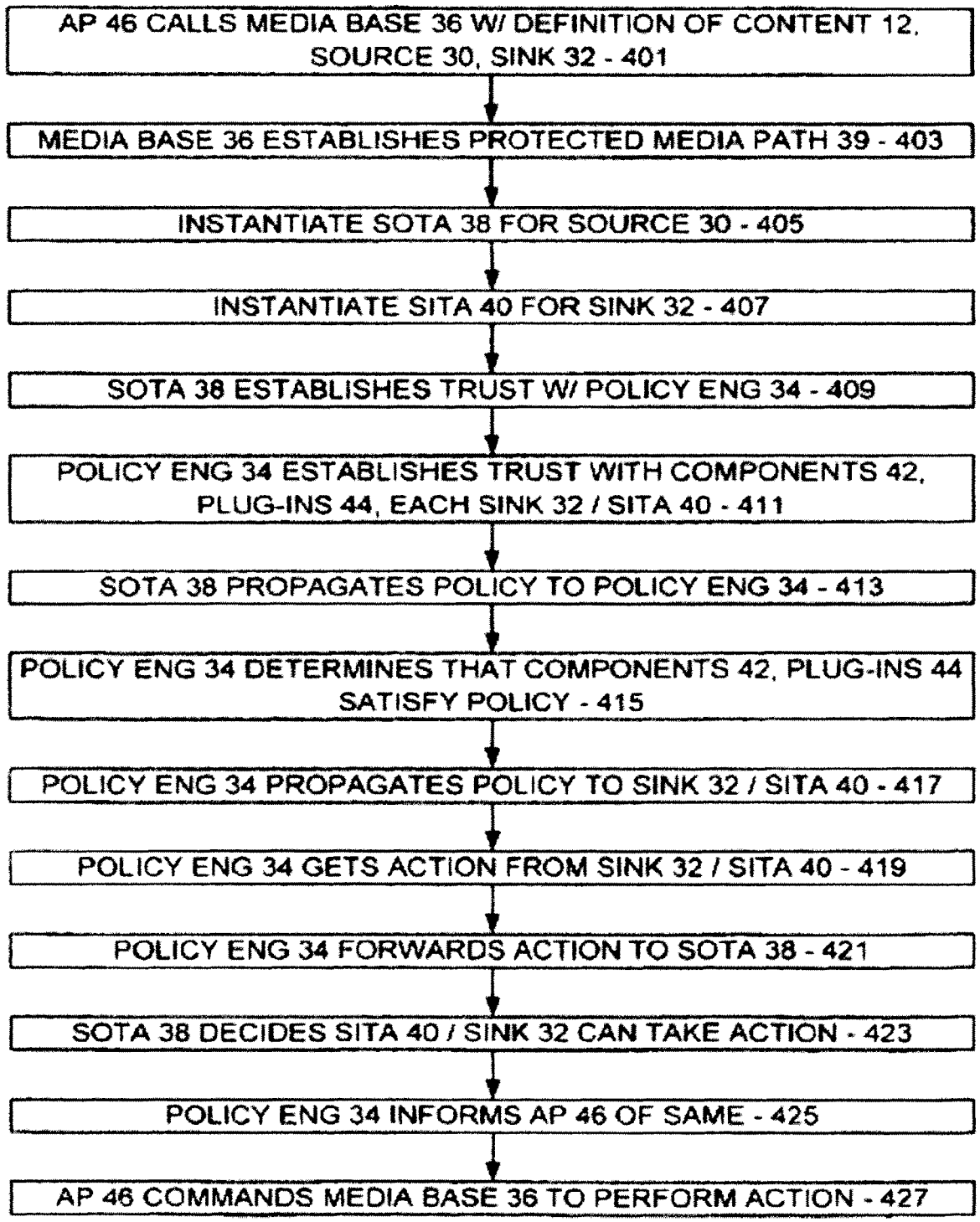
FIG. 4 is a flow diagram showing key steps performed by the portable media path of FIG. 3 in deciding whether to allow the content to be delivered from the source to the sink in accordance with one embodiment of the present invention.

Significantly, upon the media base 36 establishing the protected media path 39, a SOTA 38 corresponding to each source 30 of the defined path 39 is instantiated as a secure lockbox connecting the source 30 to the media base 36, as is seen in FIG. 3 (step 405, FIG. 4). Such instantiation may be performed by the source 30, by the media base 36, or by a combination thereof without departing from the spirit and scope of the present invention. As was set forth above, each SOTA 38 is a trust authority and represents the corresponding source 30 in the protected media path 39, and functions to provide decryption functionality for content 12 from the source 30 if necessary and also to translate policy associated with the content 12 from a native format into a format amenable to the policy engine 34 of the media base 36. Note, too that the SOTA 38 may also act for the source 30, particularly with regard to questions relating to trust, policy, and rights.

Also significantly, upon the media base 36 establishing the protected media path 39, a SITA 40 corresponding to each sink 32 of the defined path 39 is instantiated as a secure lockbox connecting the sink 32 to the media base 36, as is seen in FIG. 3 (step 407, FIG. 4). Such instantiation may likewise be performed by the sink 32, by the media base 36, or by a combination thereof without departing from the spirit and scope of the present invention. As was also set forth above, each SITA 40 is a trust authority and represents the corresponding sink 32 in the protected media path 39, and functions to provide encryption functionality for content 12 to be delivered to the sink 32 if necessary and also to translate policy associated with the content 12 from the format of the policy engine 34 into a format amenable to the sink 32. Also note, too that the SITA 40 may also act for the sink, particularly with regard to questions relating to trust, policy, and rights.

In one embodiment of the present invention, the SOTA 38 acting on behalf of the source 30 establishes trust with respect to the protected media path 39. Thereafter, and once trust is established, the SOTA 38 propagates policy corresponding to the content 12 to be rendered, as was defined by the application 46 at step 401. In particular, the SOTA 38 establishes trust by first establishing trust with the policy engine 34 of the media base 36 (step 409). Thereafter, the trusted policy engine 34 establishes trust with the remainder of the protected media path 39, including each component 42, each plug-in 44, and each sink 32 as represented by the SITA 40 thereof (step 411).

In establishing trust, and as was set forth above, an element can be shown to be trustworthy based on a proffer of a token such as a digital certificate from a vouching authority that vouches for the element. Such token/certificate could include a hash of the to-be-trusted element verifiable based on a key in the certificate, whereby establishing trust of the element can include verifying the hash. Note that if at any point trust is not established with an element, such element is refused access to the content 12. Thus, the element must be removed from the protected media path 39, if possible. If not possible, the SOTA 38 does not release content 12 to the protected media path 39.

Presuming the trusted policy engine 34 in fact establishes trust with each element of the protected media path 39 including each component 42, each plug-in 44, and each sink 32 as represented by the SITA 40 thereof, the SOTA 38 then propagates policy corresponding to the content 12 to be rendered. In particular, the SOTA 38 propagates such policy to the policy engine 34 (step 413). In doing so, the SOTA 38 employs functionality therein as necessary to translate the policy from a native format into a format amenable to the policy engine 34 of the media base 36, and then transmits the translated policy to the policy engine 34.

Thereafter, the policy engine 34 with the translated policy establishes that each component 42 and each plug-in 44 of the media base 36 has the right to touch or access the content 12 corresponding to the translated policy. In particular, based on the translated policy, the policy engine 34 as necessary determines that each such component 42 and plug-in 44 of the media base 36 satisfies the terms of the translated policy (step 415). Note that an element that is trusted may nevertheless still not have the right to touch or access the content 12 based on the policy. For example, and as was set forth above, if the policy states that an element must have at least a certain version number and the element has an older version number, the element though trusted still does not have the right to touch or access the content 12. Note that if at any point a trusted element does not have the right to access or touch the content 12 as determined by the policy engine 34, such element is refused access to the content 12. Thus, the element must be removed from the protected media path 39, if possible. If not possible, the SOTA 38 does not release content 12 to the protected media path 39.

In addition, the policy engine 34 with the translated policy establishes that each sink 32 in the protected media path 39 has the right to touch or access the content 12 corresponding to the translated policy. In particular, the policy engine 34 propagates such translated policy to the SITA 40 of the sink 32 (step 417). In doing so, the SITA 40 likewise employs functionality therein as necessary to re-translate the translated policy into a format amenable to the sink 32, and then transmits the re-translated policy to the SITA 40. Thereafter, the sink 32 and SITA 40 thereof as trusted elements of the protected media path 39 are trusted to abide by such re-translated policy.

In one embodiment of the present invention, the policy engine 34 in addition or as an alternative requests that the sink 32 by way of the SITA 40 thereof for an action that the sink 32 intends to take with regard to the content 12 corresponding to the policy (step 419). Such action may for example comprise playing the content 12, copying the content 12, exporting the content 12 in a non-protected format, and the like. Note that inasmuch as the protected media path 39 including the SITA 40 and the sink 32 thereof was established at the behest of the application 46, such SITA 40/sink 32 should know explicitly or implicitly what action is intended to be taken with regard to the content 12. Note too that although the policy engine 34 could ask the application 46 for such action, the application 46 is not trusted to respond truthfully, while the sink 32/SITA 40 are in fact so trusted.

At any rate, the trusted sink 32/SITA 40 responds with such action and the policy engine 34 forwards same to the SOTA 38 (step 421). Thereafter, the SOTA 38 decides whether the SITA 40/sink 32 can take the action, presumably with reference to the policy corresponding to the content 12, and informs the policy engine 34 of same (step 423). As should be appreciated, if the action cannot be taken, the SOTA 38 will not allow the content 12 to be released to the protected media path 39.

Presuming that the action can be taken, the policy engine 34 informs the application 46 of same (step 425), and the application 46 may then proceed by commanding the media base 36 to perform such action and related actions (step 427). For example, the application may command the media base to play the content 12, and also may at a later time command the media base 36 to stop, rewind, fast forward, skip ahead, skip back, and the like.

Note that in the course of taking the action, the content 12 transits the protected media path 39 as arranged by the media base 36. In particular, the media base 36 retrieves the content 12 from the source 30, uses the decryption functionality of the SOTA 38 to decrypt the content 12 as necessary, and then sends the content 12 downstream. Thus, the media base 36 and the components 42 and plug-ins 44 thereof perform whatever processes are necessary on the content 12, and the media base 36 then uses the encryption functionality of the SITA 40 to encrypt the content 12 as necessary and delivers the content 12 to the sink 32. Of course, the sink 32 then sends the content 12 to an ultimate destination.

The action as taken with regard to the content 12 should be communicated by the policy engine 34 to the SOTA 38 so that the SOTA 38 can update any state information relevant to the policy corresponding to such content 12. For example, if the policy requires that a play count be kept, the SOTA 38 should note after some point that the play count be adjusted. Alternatively, the SOTA 38 as the deliverer of the content 12 may itself sense that the action is being taken and thereafter update any state information as necessary.

As should now be appreciated, the application 46 may at some later point decide to reconfigure the protected media path 39. For example, the application 46 may change the audio sink 32 and the light sink 32. In such case, and as should be appreciated, the process as set forth in FIG. 4 must be repeated to establish trust in the reconfigured path 39 and to propagate rights to same.

As should also be appreciated, in the present invention, a media base 36 may be instructed to establish a protected media path 39 based on some arbitrary or near-arbitrary combination of sources 30 and sinks 32. Importantly, regardless of whatever path 39 is established, the architecture of the present invention allows such path 39 to be certified as trustworthy and as being satisfactory with regard to policy or rights corresponding to content 12 that is to transit such path. Moreover, even though the path 39 is established at the behest of an application 46, such application 46 itself need not be trustworthy inasmuch as the application 46 never itself touches or accesses the content 12 in a manner that the application 46 could wittingly or unwittingly be employed to steal such content 12.

Refusal Response Enabler and Interface Therefor

As was set forth above in connection with the method show in FIG. 4, the trusted sink 32/SITA 40 provides an action intended to be taken in response to the policy engine 34 as at step 421, and the SOTA 38 decides whether the SITA 40/sink 32 can take the action and informs the policy engine 34 of same as at step 423. If the SOTA 38 refuses to allow the action to be taken, the SOTA 38 does not allow the content 12 to be released to the protected media path 39.

Such a refusal would normally end the process of FIG. 4 without more, perhaps resulting in a less-than-satisfactory experience for a user of the application 46. However, it is to be appreciated that the underlying bases for at least some types of refusals can be anticipated, that at least some of such underlying bases can be dealt with in a relatively straightforward manner, and that the SOTA 38 can therefore be constructed to include or have access to functionality to address the underlying bases of at least some refusals. Such refusals are many and varied, and can include lack of a proper license 16 (FIG. 1), lack of a current version of an element, an inclusion of a sink 32 set to perform an improper function, and the like. In one embodiment of the present invention, then, the architecture of the protected media path 39 is provided with refusal response functionality to respond to at least some refusals.

Note that such refusal response functionality might be included with the media base 36 without departing from the spirit and scope of the present invention. However, since such refusal response functionality is likely closely associated with a particular source 30, it is more likely that such functionality should be included with or accessed by the SOTA 38 corresponding to such source 30.

Figure 5:
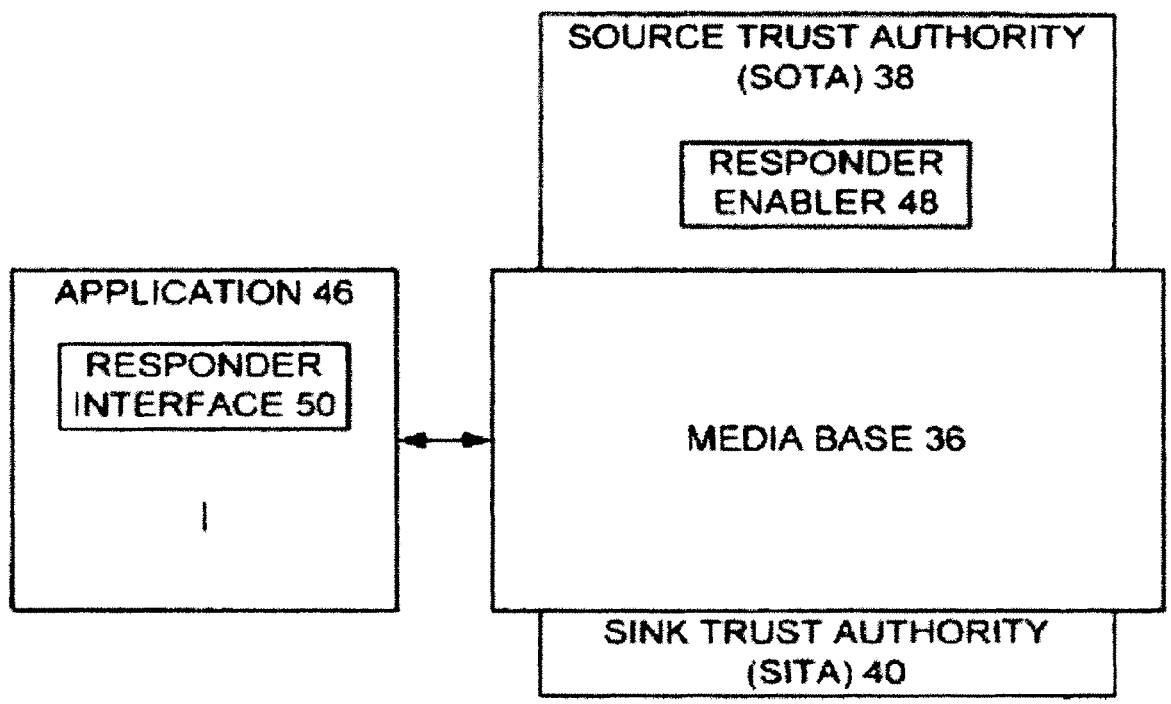
FIG. 5 is a block diagram showing a portion of the portable media path of FIG. 3, including a source trust authority with a refusal response enabler and the application with a refusal response interface for receiving and running the enabler in accordance with one embodiment of the present invention.

Note that responding to a refusal can at times require user input by way of the application 46, and at times can instead forego such user input, where the SOTA 38 responds without the aid of the user. However, as a matter of good practice, the user at the application should always be involved in a response to a refusal, especially when the response requires that an item or information be obtained from a remote source such as a network. In one embodiment of the present invention, then, and referring now to FIG. 5, each SOTA 38 provides one or more refusal responder enablers 48, each for responding to a particular refusal, and the application 46 includes a responder interface 50 which can interface with each enabler 48 as provided by way of the media base 36.

Thus, and as should be appreciated, the provided enabler 48 and the interface 50 provide an abstract layer to effectuate the details of refusal responses by the SOTA 38 by way of the application 46. In particular, the provided enabler 48 of the SOTA 38 sets forth procedures for responding to the particular refusal thereof, including one or more locations to obtain information, inputs required from the user, and the like, and the interface 50 specifies a consistent interaction procedure between the application 46 and the enabler 48 as provided by way of the media base 36. Significantly, although the provided enablers 48 vary from refusal to refusal and from source 30 to source 30, the interface 50 always employs the same interface procedures no matter what refusal or what source 30/SOTA 38 a provided enabler 48 is associated with. Thus, the application 46 employs whatever functions are available from the provided enabler 48 to perform a refusal response, with no need to distinguish the particular source 30 that provided such enabler 48. Note that although the application 46 is not trusted, whatever information or data that is obtained by way of an enabler 48 is supplied to the media base 36 and/or the portable media path 39 and may itself have to prove trustworthiness within the context of such media base 36 and/or portable media path 39. That is, there is no trust inherent in measures the application 46 takes when the interface 50 runs an enabler 48.

Figure 6:
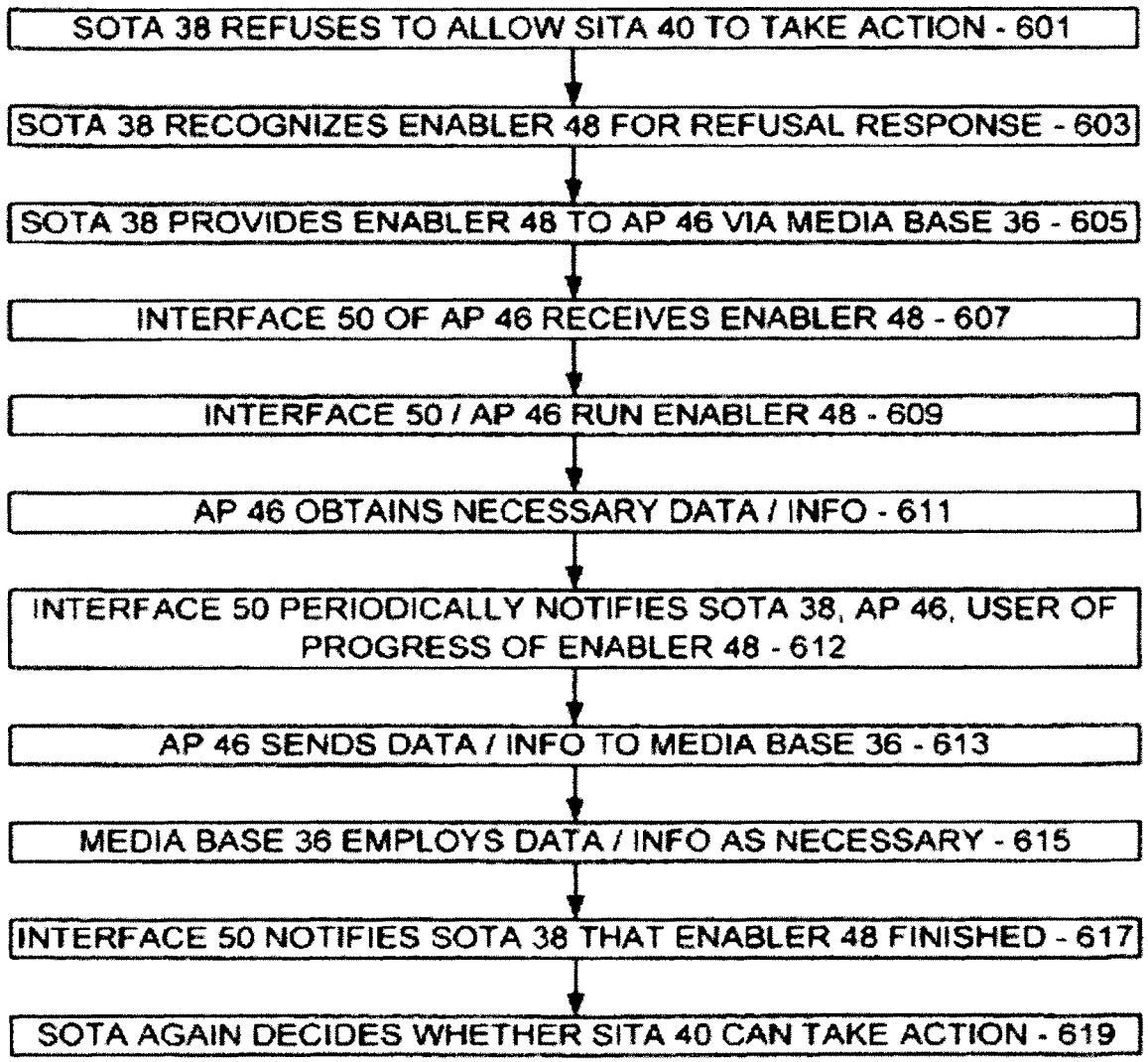
FIG. 6 is a flow diagram showing key steps performed by the elements of FIG. 5 in responding to a refusal to perform an action in accordance with one embodiment of the present invention.

Turning now to FIG. 6, it is seen that in connection with the protected media path 39, a trusted SITA 40 provides an action intended to be taken in response to the policy engine 34 as at step 421, and the SOTA 38 has refused to allow the SITA 40 to take the action at this time because of some perceived deficiency as at step 423 (step 601). However, the SOTA 38 has also recognized that the basis for the refusal may be responded to by way of application of a particular enabler 48 available to or included with such SOTA 38 (step 603), and the SOTA 38 thus provides the particular enabler 48 to the application 46 by way of the media base 36 (step 605). Note that the media base 36 may have a pointer or other reference to the interface 50 and may thus direct the provided enabler to the interface 50 of the application 46 by way of such pointer or other reference.

As may be appreciated, the provided enabler 48 includes all information and methods necessary for the application 46 by way of the interface 50 thereof to obtain whatever information or data is necessary to respond to the refusal that necessitated such provided enabler 48. Thus, the provided enabler 48 is received from the SOTA 38 by the interface 50 of the application 46 by way of the media base 36 (step 607), and the interface 50 applies the aforementioned consistent interaction procedure to in effect run the provided enabler 48 (step 609). Thus, with the provided enabler 48 and input as necessary and/or prudent from the user, the application 46 and the interface 50 thereof in fact attempt to obtain whatever data or information is necessitated by the refusal from whatever source is necessary, be it local or remote (step 611). Of course, the level of user interaction necessary varies based on the circumstances. For example, it may in some circumstances be enough to get user permission before downloading the data or information, especially if the download is without cost. If a cost is involved, however, it is of course necessary to obtain user permission to pay the cost, not to mention particulars on how to pay the cost.

Thus, if the refusal is based on lack of a proper license 16, such license 16 is obtained. If based on lack of a current version of an element, the current version of the element is obtained, and if based on an inclusion of a sink 32 set to perform an improper function, the user and/or the application sets the sink 32 appropriately, among other things. Note of course that not all refusals can be remedied. For example, a user may not wish to obtain a required license 16, a current version of an element may not be available, or a sink 32 may not be able to be set in a manner satisfactory to the SOTA 38. Of course, in such a situation the response fails and the SOTA 38 will refuse to allow the SITA 40 to take the requested action to be taken.

However, presuming that the refusal is in fact remedied by obtaining the necessary data or information, the application 46 sends such data or information to the media base 36 (step 613) and the media base 36 appropriately employs such data as necessary (step 615) by for example storing a license 16 in a license store, installing the current version of a component, adjusting the settings of a sink 32, or the like.

Once finished, the interface 50 notifies the SOTA 38, the application 46, and/or the user of the application 46 that the response as entailed by the provided enabler 48 is complete and perhaps that the response was successful or failed (step 617). In addition, it maybe the case that the consistent interaction procedure of the interface 50 includes a periodic progress notification function that periodically notifies the SOTA 38, the application 46, and/or the user of the application 46 of the progress of the response, perhaps so that none of the aforementioned time out the response and abort same. In such case the interface 50 in fact periodically notifies the SOTA 38, the application 46, and/or the user of the application 46 of the progress of the response during the course thereof (step 612).

At any rate, upon the SOTA 38 being notified that the response is complete as at step 617, the SOTA again decides whether the SITA 40/sink 32 can take the action that was originally refused (step 619). If the SOTA 38 again refuses to allow the action to be taken, the SOTA 38 again does not allow the content 12 to be released to the protected media path 39, but instead may again recognized that the basis for the refusal may be responded to by way of application of a particular enabler 48 available to or included with such SOTA 38, as at step 603, and the SOTA 38 thus again provides the particular enabler 48 to the application 46 by way of the media base 36 as at step 605.

However, presuming that the SOTA 38 in fact now allows the SITA 40 to take the requested action, the SOTA 38 at this point does allow the content 12 to be released to the protected media path 39, and the policy engine 34 informs the application 46 of same as at step 425 of FIG. 4. As should now be appreciate, the application 46 may then proceed by commanding the media base 36 to perform such action and related actions as at step 427 of FIG. 4.

As should now be appreciated, the SOTA 38 employs an enabler 48 which is executed by the interface 50 of the application 46 to allow the SOTA 38 to get the user and/or the application 46 to perform a response for the SOTA 38 when the SOTA refuses an action requested by a SITA 40. Although the SOTA 38 could perhaps perform the response on its own, as a matter of good practice, the user at the application should always be involved in a response to a refusal, especially when the response requires that data or information be obtained from a remote source such as a network. Moreover, and at any rate, there are times when such user involvement at the application 46 is necessary.

CONCLUSION

The present invention may be practiced with regard to any appropriate source 30 and sink 32, presuming that such source 30 and sink 32 have a corresponding SOTA 38 and SITA 40, respectively, by which communication with the media base 36 can be achieved. Accordingly, the protected media path 39 of the present invention is to be interpreted to encompass any SOTA 38, media base 36, and SITA 40 that can establish such protected media path 39 in an arbitrary manner so as to deliver content from a source 30 to a sink 32.

Note that although the present invention is disclosed primarily in terms of a sink 32 that performs rendering or playback, the sink 32 may perform other actions without departing from the spirit and scope of the present invention. Such other actions include but are not limited to transferring the content 12 to a separate computing device 14 such as a personal computer, a portable device, or the like; transferring the content 12 to a portable memory, a magnetic or optical disk, or the like; transferring the content 12 in a different protection scheme; exporting the content 12 without any protection scheme; transferring or exporting the content 12 in a different format; etc.

In general, then, the protected media path 39 as arranged by the media base 36 can be employed to render or play back content 12, and also to perform tasks such as content creation, editing, and distribution. For example, content 12 could have policy that allows or forbids the content 12 to be edited in certain ways. Thus, the protected media path 39 could be employed to decrypt content 12, edit same, and then re-encrypt, all in a manner that follows the policy corresponding to the content 12.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that define a protected media path 39 for content 12 from any of a plurality of sources 30 to be delivered to any of a plurality of sinks 32. The method in connection with such architecture defines how the path is established as trustworthy and satisfying policy corresponding to the content 12.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of delivering content from a source to a sink by way of a computing device, the method comprising:
   an application on the computing device calling to a media base on the computing device with a definition of the content, the source, and the sink, the application having an interface that applies a common interaction procedure between the application and each of a plurality of different enablers of each of a plurality of different sources;
   the media base preventing the application from accessing the content and establishing a protected media path based on the defined content, source, and sink to effectuate such delivery, the established protected media path including:
      the media base;
      a source trust authority (SOTA) associated with and corresponding to the source, the SOTA acting as a secure lockbox connecting the source to the media base and representing the source in the protected media path; and a sink trust authority (SITA) associated with and corresponding to the sink, the SITA acting as a secure lockbox connecting the sink to the media base and representing the sink in the protected media path;

the SOTA determining a particular type of action to be taken with the content as delivered through the protected media path;

the SOTA deciding with regard to the propagated policy that the particular type of action cannot be taken with the content as delivered through the protected media path and informing the media base of a refusal to take such action;

the media base informing the application of the refusal to take the action;

the SOTA recognizing that the refusal may be rectified by way of a particular enabler available to such SOTA and the SOTA providing the particular enabler to the application by way of the media base, the provided enabler including information and methods necessary for the application to obtain data necessary to respond to the refusal;

the application receiving the enabler at the interface by way of the media base, and the interface applying the common interaction procedure to run the enabler to obtain the data necessary to respond to the refusal; the application providing the obtained data to the media base and the media base, upon verifying the obtained data as trustworthy, employing the provided data to respond to the refusal;

the SOTA deciding with regard to the propagated policy and based at least in part on the responded refusal that the particular type of action can be taken with the content as delivered through the protected media path and informing the media base regarding same; and the media base informing the application that the particular type of action can be taken, and the application proceeding by commanding the media base to perform such type of action.

2. The method of claim 1 comprising the SOTA providing the particular enabler to the application by the media base providing the application with a reference to the particular enabler.

3. The method of claim 1 comprising the interface running the enabler in an attempt to obtain the necessary data from a user of the application.

4. The method of claim 1 comprising the interface running the enabler in an attempt to obtain the necessary data from one of the computing device of the application and another computing device coupled to the computing device of the application.

5. The method of claim 1 comprising the SOTA refusing to take the action because of the lack of a proper license corresponding to the content and the interface running the enabler to obtain the proper license.

6. The method of claim 1 comprising the SOTA refusing to take the action because of the lack of a current version of an element of the protected media path and the interface running the enabler to obtain and install the current version of the element.

7. The method of claim 1 comprising the SOTA refusing to take the action because the SITA is set to be able to perform an impermissible action with respect to the content and the interface running the enabler to set the SITA to not be able to perform the impermissible action.

8. The method of claim 1 comprising the interface of the application periodically providing a progress notification to at least one of the SOTA, the application, the media base, and a user of the application.

9. The method of claim 1 comprising the SOTA providing the particular enabler to the application from among a plurality of enablers each for responding to a particular refusal, and the interface applying a common interaction procedure to run the particular enabler where the common interaction procedure can run each of the plurality of enablers.

10. The method of claim 1 further comprising:

the SOTA on behalf of the source establishing trust with respect to the protected media path;

the SOTA upon trust being established with respect to the protected media path propagating policy corresponding to the content to be delivered to the protected media path.

11. A method of delivering content from a source to a sink by way of a computing device where an application on the computing device defines to a media base on the computing device the content, the source, and the sink and the media base prevents the application from accessing the content and establishes a protected media path based on the defined content, source, and sink to effectuate such delivery, the established protected media path including the media base, a source trust authority (SOTA) associated with and corresponding to the source, the SOTA acting as a secure lockbox connecting the source to the media base and representing the source in the protected media path, and a sink trust authority (SITA) associated with and corresponding to the sink, the SITA acting as a secure lockbox connecting the sink to the media base and representing the sink in the protected media path, the method comprising the SOTA:

establishing trust with respect to the protected media path;

upon trust being established with respect to the protected media path, propagating policy corresponding to the content to be delivered to the protected media path;

determining a particular type of action to be taken with the content as delivered through the protected media path;

deciding with regard to the propagated policy that the particular type of action cannot be taken with the content as delivered through the protected media path and informing the media base of a refusal to take such action, where the media base informs the application of the refusal to take the action;

recognizing that the refusal may be rectified by way of a particular enabler available to such SOTA and providing the particular enabler to the application by way of the media base, the enabler provided through an interface that applies a common interaction procedure between the application and each of a plurality of different enablers of each of a plurality of different sources, the provided enabler including information and methods necessary for the application to obtain data necessary to respond to the refusal, and where the application provides the obtained data to the media base and the media base, upon verifying the obtained data as trustworthy, employs the provided data to respond to the refusal; and deciding with regard to the propagated policy and based at least in part on the responded refusal that the particular type of action can be taken with the content as delivered through the protected media path and informing the media base regarding same, where the media base informs the application that the particular type of action can be taken, and the application proceeds by commanding the media base to perform such type of action.

12. The method of claim 11 comprising the SOTA providing the particular enabler to the application by the media base providing the application with a reference to the particular enabler.

13. The method of claim 11 comprising the SOTA refusing to take the action because of the lack of a proper license corresponding to the content and the interface running the enabler to obtain the proper license.

14. The method of claim 11 comprising the SOTA refusing to take the action because of the lack of a current version of an element of the protected media path and the interface running the enabler to obtain and install the current version of the element.

15. The method of claim 11 comprising the SOTA refusing to take the action because the SITA is set to be able to perform an impermissible action with respect to the content and the interface running the enabler to set the SITA to not be able to perform the impermissible action.

16. The method of claim 11 comprising the SOTA periodically receiving a progress notification from the interface of the application.

17. The method of claim 11 comprising the SOTA providing the particular enabler to the application from among a plurality of enablers each for responding to a particular refusal, where the interface applies a common interaction procedure to run the particular enabler such that the common interaction procedure can run each of the plurality of enablers.

* * * * *